(12) United States Patent
Yabunouchi et al.

(10) Patent No.: US 10,082,313 B2
(45) Date of Patent: Sep. 25, 2018

(54) INSTRUCTION DEVICE, AND AIR CONDITIONING SYSTEM

(71) Applicant: Panasonic Intellectual Property Management Co., Ltd., Osaka (JP)

(72) Inventors: Nobuaki Yabunouchi, Kyoto (JP); Hayato Takahashi, Hyogo (JP); Naoki Muro, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 568 days.

(21) Appl. No.: 14/767,908

(22) PCT Filed: Feb. 7, 2014

(86) PCT No.: PCT/JP2014/000675
§ 371 (c)(1),
(2) Date: Aug. 13, 2015

(87) PCT Pub. No.: WO2014/125805
PCT Pub. Date: Aug. 21, 2014

(65) Prior Publication Data
US 2016/0018123 A1 Jan. 21, 2016

(30) Foreign Application Priority Data
Feb. 13, 2013 (JP) .................. 2013-025638

(51) Int. Cl.
*G05B 15/00* (2006.01)
*F24F 11/62* (2018.01)
(Continued)

(52) U.S. Cl.
CPC .......... *F24F 11/62* (2018.01); *F24F 11/0001* (2013.01); *F24F 11/30* (2018.01);
(Continued)

(58) Field of Classification Search
CPC .... F24F 11/62; F24F 2011/0006; F24F 11/30; Y02B 30/90
(Continued)

(56) References Cited

U.S. PATENT DOCUMENTS

| 2010/0070088 A1 | 3/2010 | Josserand et al. |
| 2012/0310420 A1* | 12/2012 | Quirk ................. G05D 23/1934 700/278 |

(Continued)

FOREIGN PATENT DOCUMENTS

| EP | 1816408 A1 | 8/2007 |
| JP | 06-288595 A | 10/1994 |

(Continued)

OTHER PUBLICATIONS

Lee, Jeong H., "Optimization of Indoor Climate Conditioning With Passive and Active Methods Using GA and CFD", May 5, 2005, Building and Environment 42 (2007), pp. 3333-3340.*

(Continued)

*Primary Examiner* — Mohammad Ali
*Assistant Examiner* — Sheela S Rao
(74) *Attorney, Agent, or Firm* — McDermott Will & Emery LLP

(57) ABSTRACT

The instruction device according to the present invention is used in an air conditioning system. In a case where evaluation information concerning comfort of an air environment of an indoor space for person(s) in the indoor space corresponds to discomfort and a difference between first data on the air environment of the indoor space and second data on an air environment of an outdoor space is not less than a prescribed value, the instruction device creates setting information to use only a first air conditioning device for causing movement of air between the indoor and outdoor spaces when determining that the comfort can be improved by the (Continued)

first air conditioning device, and creates setting information to use a second air conditioning device for controlling the air environment of the indoor space by consuming energy resource when determining that the comfort cannot be improved by the first air conditioning device.

13 Claims, 3 Drawing Sheets

(51) Int. Cl.
| | | |
|---|---|---|
| *G05B 15/02* | (2006.01) | |
| *F24F 11/30* | (2018.01) | |
| *F24F 11/00* | (2018.01) | |
| *F24F 1/00* | (2011.01) | |
| *F24F 110/00* | (2018.01) | |
| *F24F 110/10* | (2018.01) | |
| *F24F 110/12* | (2018.01) | |
| *F24F 11/64* | (2018.01) | |
| *F24F 11/65* | (2018.01) | |
| *F24F 11/46* | (2018.01) | |

(52) U.S. Cl.
CPC .............. *G05B 15/02* (2013.01); *F24F 11/46* (2018.01); *F24F 11/64* (2018.01); *F24F 11/65* (2018.01); *F24F 2001/0051* (2013.01); *F24F 2011/0005* (2013.01); *F24F 2011/0006* (2013.01); *F24F 2110/00* (2018.01); *F24F 2110/10* (2018.01); *F24F 2110/12* (2018.01)

(58) Field of Classification Search
USPC ............................ 700/276; 454/269; 165/59
See application file for complete search history.

(56) References Cited

U.S. PATENT DOCUMENTS

| | | | |
|---|---|---|---|
| 2014/0031992 A1* | 1/2014 | Bergman | ................ F24F 11/00 700/276 |
| 2015/0369505 A1* | 12/2015 | Malve | .................. H04W 4/008 700/276 |

FOREIGN PATENT DOCUMENTS

| | | |
|---|---|---|
| JP | 09-014720 A | 1/1997 |
| JP | 2000-310437 A | 11/2000 |
| JP | 2006-029748 A | 2/2006 |
| JP | 2007-183032 A | 7/2007 |
| JP | 2009-002574 A | 1/2009 |
| JP | 2010-236732 A | 10/2010 |
| JP | 2012-013375 A | 1/2012 |
| JP | 2012-172963 A | 9/2012 |

OTHER PUBLICATIONS

Extended European Search Report dated Mar. 1, 2015 issued in European Patent Application No. 14751251.1.
International Search Report dated Apr. 8k, 2014 issued in International Patent Application No. PCT/JP2014/00675.

* cited by examiner

INSTRUCTION DEVICE, AND AIR CONDITIONING SYSTEM

RELATED APPLICATIONS

This application is the U.S. National Phase under 35 U.S.C. § 371 of International Application No. PCT/JP2014/000675, filed on Feb. 7, 2014 which in turn claims the benefit of Japanese Patent Application No. 2013-025638 filed on Feb. 13, 2013, the disclosures of which applications are incorporated by reference herein.

TECHNICAL FIELD

The present invention relates to instruction devices and air conditioning systems, and in particular to an instruction device for determining operation states of air conditioning devices and an air conditioning system including the instruction device and performing air conditioning on an indoor space.

BACKGROUND ART

In the past, there has been known a technique of using in combination passive air conditioning for taking air into an indoor space from an outdoor space in order to control an air environment of the indoor space and active conditioning for controlling the air environment of the indoor space by use of an air conditioner (see document 1 [JP 9-14720 A]).

In the technique disclosed in document 1, a sensible temperature of a person in a building when a thermal environment of an outside of the building is reflected in a thermal environment of an inside of the building is predicted by use of a pseudo sensible temperature model, and a result of the prediction is used to determine whether to perform the passive air conditioning or the active air conditioning.

In the technique disclosed in document 1, to select the passive air conditioning (e.g., natural ventilation and forced ventilation) or the active air conditioning, calculation based on the pseudo sensible temperature model is conducted. This calculation requires a lot of parameters.

Therefore, to introduce this technique is considered to take a lot of work and time. Further, to make the pseudo sensible temperature model conform to a property of a human sensible temperature, it is considered that correction of parameters is necessary.

The technique disclosed in document 1 is effective to a building accommodating a lot of persons, but is not suitable for an indoor space accommodating a few persons such as a general residence. To apply the technique of document 1 to the indoor space accommodating a few persons, it is considered to use an index of comfort instead of the pseudo sensible temperature model.

However, the comfort greatly varies depending on physical conditions and activity histories of persons, feelings and psychological states of individuals. Hence, even when an index derived from calculation such as PMV (Predicted Mean Vote) is used for evaluation of comfort, there is no assurance that the air environment comfortable for persons-in-room is obtained.

SUMMARY OF INVENTION

The objective of the present invention is to provide an instruction device and air conditioning system which are capable of achieving an air environment with which one or more persons-in-room feel comfortable, by use of passive air conditioning and active air conditioning.

The instruction device of the first aspect in accordance with the present invention includes a first obtainer, a second obtainer, an evaluation information obtainer, an operation determiner, and an outputter. The first obtainer is configured to obtain first data indicative of a numerical value corresponding to an air environment of an indoor space. The second obtainer is configured to obtain second data indicative of a numerical value corresponding to an air environment of an outdoor space. The evaluation information obtainer is configured to obtain evaluation information concerning comfort of the air environment of the indoor space for one or more persons in the indoor space. The operation determiner is configured to create setting information determining operation states of a first air conditioning device configured to cause movement of air between the indoor space and the outdoor space and a second air conditioning device configured to control the air environment of the indoor space by consuming an energy resource. The outputter is configured to output the setting information created by the operation determiner.

In the instruction device of the second aspect in accordance with the present invention realized in combination with the first aspect, the air environment of the indoor space is an indoor temperature defined as a temperature of air in the indoor space. The air environment of the outdoor space is an outdoor temperature defined as a temperature of air in the outdoor space. The second air conditioning device is configured to cause heat radiation or heat absorption by consuming the energy resource. The first obtainer is configured to obtain the first data from an indoor temperature meter for measuring the indoor temperature. The second obtainer is configured to obtain the second data from an outdoor temperature meter for measuring the outdoor temperature.

In the instruction device of the third aspect in accordance with the present invention realized in combination with the second aspect, the operation determiner is configured to, when a temperature comfortable for one or more persons in the indoor space is between the indoor temperature indicated by the first data obtained by the first obtainer and the outdoor temperature indicated by the second data obtained by the second obtainer, determine that the comfort can be improved by the first air conditioning device.

In the instruction device of the fourth aspect in accordance with the present invention realized in combination with the third aspect, the operation determiner is configured to, when determining that the comfort can be improved by the first air conditioning device, create the setting information instructing to conduct movement of air from the outdoor space to the indoor space by using the first air conditioning device without using the second air conditioning device.

In the instruction device of the fifth aspect in accordance with the present invention realized in combination with the third or fourth aspect, the operation determiner is configured to, when determining that the comfort cannot be improved by the first air conditioning device, create the setting information instructing to operate the second air conditioning device so as to adjust the indoor temperature to the temperature comfortable for one or more persons in the indoor space.

In the instruction device of the sixth aspect in accordance with the present invention realized in combination with the third or fourth aspect, the operation determiner is configured to, when determining that the comfort cannot be improved by the first air conditioning device and when the movement of air from the outdoor space to the indoor space by using the first air conditioning device is already conducted, create the setting information instructing to end the movement of air from the outdoor space to the indoor space by using the first air conditioning device and operate the second air conditioning device so as to adjust the indoor temperature to the temperature comfortable for one or more persons in the indoor space.

In the instruction device of the seventh aspect in accordance with the present invention realized in combination with any one of the third to sixth aspects, the operation determiner is configured to select, as the temperature comfortable for one or more persons in the indoor space, a temperature, which is closest to the indoor temperature, from a range of temperatures comfortable for one or more persons in the indoor space.

In the instruction device of the eighth aspect in accordance with the present invention realized in combination with any one of the first to seventh aspects, the operation determiner is configured to create the setting information on the basis of the first data obtained by the first obtainer, the second data obtained by the second obtainer, and auxiliary information. The auxiliary information is information concerning a factor effecting on the air environment of the indoor space.

In the instruction device of the ninth aspect in accordance with the present invention realized in combination with any one of the first to eighth aspects, the outputter is configured to create, based on the setting information, information for controlling operation of the second air conditioning device.

In the instruction device of the tenth aspect in accordance with the present invention realized in combination with any one of the first to ninth aspects, the outputter is configured to convert the setting information into information in a format available for a predetermined display and output the information.

The air conditioning system of the eleventh aspect in accordance with the present invention includes: a first air conditioning device configured to cause movement of air between an indoor space and an outdoor space; a second air conditioning device configured to control an air environment of the indoor space by consuming an energy resource; an evaluation device configured to create evaluation information concerning comfort of the air environment of the indoor space for one or more persons in the indoor space; and the instruction device of any one of the first to tenth aspects.

In the air conditioning system of the twelfth aspect in accordance with the present invention realized in combination with the eleventh aspect, the evaluation device includes an inputter configured to receive the evaluation information from one or more persons in the indoor space.

In the air conditioning system of the thirteenth aspect in accordance with the present invention realized in combination with the eleventh or twelfth aspect, the evaluation device includes a history storage and an estimator. The history storage is configured to store a record including a combination of the first data, the second data, the setting information, and the evaluation information. The estimator is configured to estimate current evaluation information from a combination of current first data, current second data, and current setting information, by use of the record stored in the history storage.

DESCRIPTION OF EMBODIMENTS (Embodiment 1)
1. Structures

Figure 1:
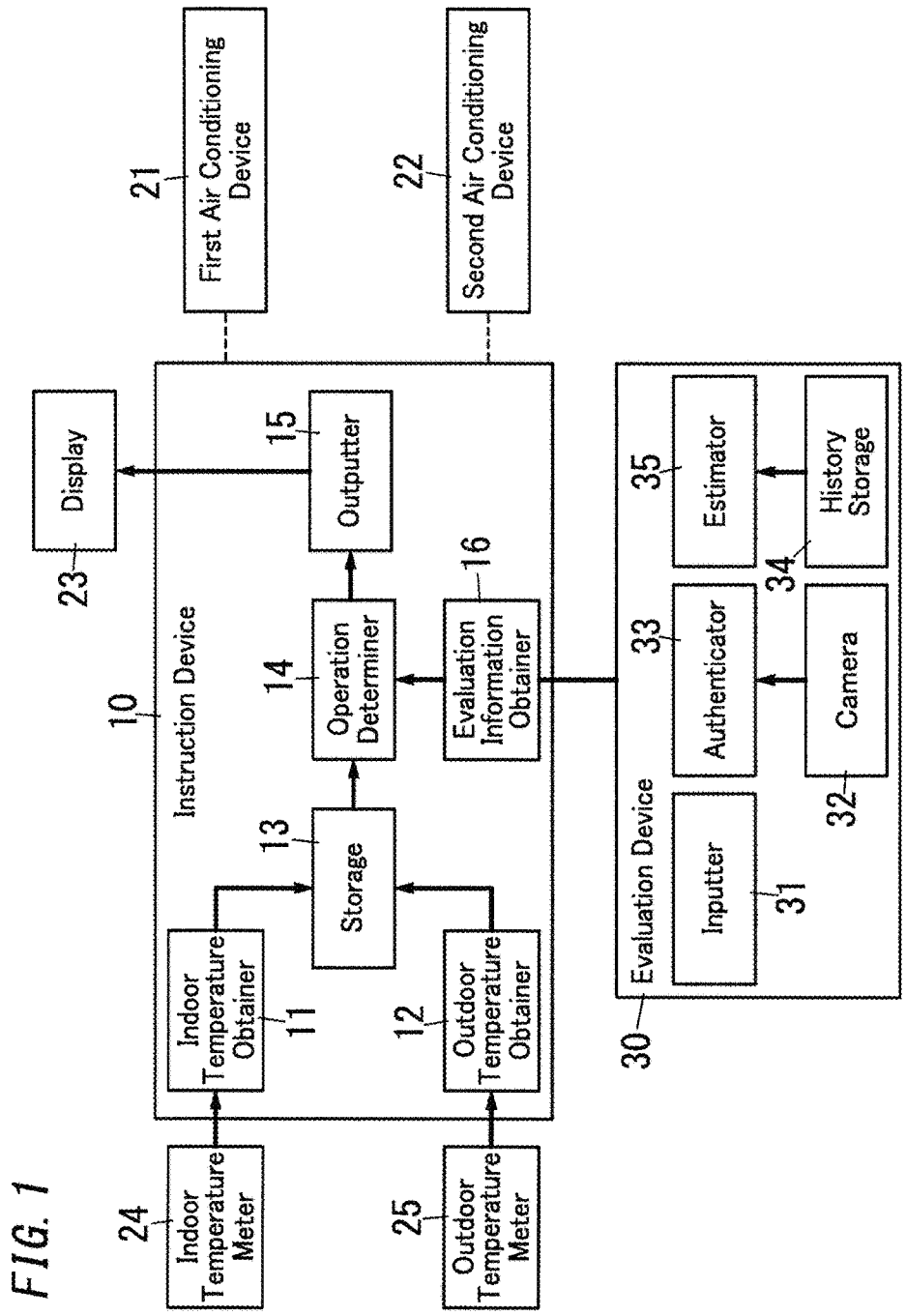
FIG. 1 is a block diagram illustrating the air conditioning system of Embodiment 1.

As shown in FIG. 1, the air conditioning system of the present embodiment is configured to perform air conditioning on an indoor space of a building by use of two types of air conditioning devices 21 and 22.

One air conditioning device (first air conditioning device) 21 adjusts a temperature of the indoor space by causing movement of air between the indoor space of which an air environment is to be controlled and an outdoor space of which an air environment is not to be controlled.

The other air conditioning device (second air conditioning device) 22 adjusts, by consuming an energy resource, the air environment of the indoor space so as to be different from the air environment of the outdoor space.

The air environment may be one or more physical, chemical, and biological factors such as temperature, relative humidity, airstream, suspended particulates (including dusts, pollen, and the like), carbon dioxide, carbon monoxide, and formaldehyde. Hereinafter, the air environment means the air environment concerning thermal comfort. In this sense, the air environment is selected from temperature, relative humidity, airstream, and the like.

It is necessary to measure the air environments of the indoor space and the outdoor space. If the air environment including relative humidity and airstream in addition to temperature is used, such measurement becomes complex. Hence, as a basic technique, a technique focusing on temperature in the air environment is described. However, if factors other than temperature, such as relative humidity and airstream, are quantitatively measured, these factors may be included in the air environment.

With regard to temperature in the air environment, the first air conditioning device 21 adjusts a temperature of the indoor space by causing movement of air between the indoor space and the outdoor space, and the second air conditioning device 22 adjusts the temperature of the indoor space by causing heat radiation or heat absorption by consuming the energy resource.

The first air conditioning device 21 is a passive air conditioning device designed to move heat by an air flow. Typical examples of the passive air conditioning device may include a window provided to a wall or a ceiling of a building for natural ventilation, an entrance with an openable door, an openable air vent, a shutter with angle adjustable slats, and the like. Additionally, the first air conditioning device 21 may be a ventilation fan or an air blower for forced ventilation, an air conditioning device designed to move air from an underfloor or roof space to a room, an air conditioning device designed to use internal heat, an air conditioning device designed to include thermal storage enabling heat radiation and heat accumulation, or the like. The first air conditioning device moves heat so that the temperature of the indoor space is equal to the temperature of the outdoor space.

The second air conditioning device 22 is an active air conditioning device designed to cause heat radiation or heat absorption by consuming an energy resource (secondary energy resource) such as electric energy, gas, and heating oil. Typical examples of the active air conditioning device may include an air conditioning device using a heat pump and an absorption type air conditioning device. Further, the second air conditioning device 22 may be a stove, a fan heater, a floor heating appliance, or the like. The second air conditioning device 22 moves heat so as to increase a difference between the temperatures of the indoor space and the outdoor space.

Note that, when the air environment includes relative humidity, airstream, and the like, the second air conditioning device 22 may be one or more selected from an air conditioning device with humidifying and dehumidifying functions, humidifier, dehumidifier, an electric fan, and the like.

As shown in FIG. 1, the air conditioning system of the present embodiment includes, in addition to the first air conditioning device 21 and the second air conditioning device 22, an instruction device 10 configured to output setting information determining operation states of the first air conditioning device 21 and the second air conditioning device 22, and an evaluation device 30 configured to determine evaluation information indicative of comfortable or uncomfortable feelings of one or more persons-in-room in the indoor space (i.e., one or more persons in the indoor space).

In short, in the air conditioning system of the present embodiment, the instruction device 10 for determining the operation states of the first air conditioning device 21 and the second air conditioning device 22 uses the evaluation information indicative of feelings of one or more persons-in-room in order to create the setting information.

The instruction device 10 includes a first obtainer (indoor temperature obtainer) 11 configured to obtain from a first meter (indoor temperature meter) 24 data concerning the air environment of the indoor space as first data, and a second obtainer (outdoor temperature obtainer) 12 configured to obtain from a second meter (outdoor temperature meter) 25 data concerning the air environment of the outdoor space as second data. In summary, the first obtainer 11 obtains the first data indicative of a numerical value corresponding to the air environment of the indoor space. The second obtainer 12 obtains the second data indicative of a numerical value corresponding to the air environment of the outdoor space.

The first data is data concerning the indoor temperature, for example, and the second data is data concerning the outdoor temperature, for example. In more detail, the air environment of the indoor space is the indoor temperature which is a temperature of air in the indoor space. The first obtainer 11 is configured to obtain the first data from the indoor temperature meter 24 configured to measure the indoor temperature. The air environment of the outdoor space is the outdoor temperature which is a temperature of air in the outdoor space. The second obtainer 12 is configured to obtain the second data from the outdoor temperature meter 25 configured to measure the outdoor temperature.

When either the first air conditioning device 21 or the second air conditioning device 22 is used in order to make the air environment of the indoor space comfortable for one or more persons-in-room, the instruction device 10 creates the setting information so as to instruct that the first air conditioning device 21 is used in priority to the second air conditioning device 22.

The first air conditioning device 21 improves the air environment without using an energy resource, or by using an energy resource to an extent to cause movement of air. Hence, in contrast to a case where the second air conditioning device 22 causing heat radiation or heat absorption by consuming an energy resource is used in priority to the first air conditioning device 21, the energy saving can be improved.

The instruction device 10 determines the operation states of the first air conditioning device 21 and the second air conditioning device 22 in order to achieve energy saving without decreasing comfort of persons-in-room.

In the following description, it is assumed that there is one person-in-room in the indoor space. Note that, if there are two or more persons-in-room in the indoor space, the evaluation device 30 may calculate evaluation information representing pieces of evaluation information individually obtained from the persons-in-room. For example, when each of the pieces of evaluation information individually obtained from the persons-in-room indicates one of two values which are comfort and discomfort, one of them, which is larger in number than the other, is used as the evaluation information. Alternatively, when the evaluation information is expressed by a numerical value, the evaluation device 30 may use, as the evaluation information, a numerical value selected from an average value, a central value, a mode value, a minimum value, a maximum value, a difference between a maximum value and a minimum value, and the like.

In the present embodiment, an example of the first air conditioning device 21 is a window, an entrance, and a ventilation fan, and an example of the second air conditioning device 22 is an air conditioning device (so-called, an air conditioner) equipped with a heat pump.

One or more windows or entrances for causing movement of air between the indoor space of interest and the outdoor space are provided to a room of interest. Such windows and entrances are assumed to be openable. For example, such windows may have any structure, provided that they are openable. Typical examples of such windows may include a sliding window, a casement, and a louver window. For example, such entrances may have any structure provided that they are a doored entrance such as a sliding door and a hinged door.

When two or more windows or entrances are provided to a room of interest, the setting information contains positions of windows or entrances to be opened or closed. It is assumed that windows or entrances are manually opened or closed. However, power-operated windows or doors can be used, and in this case it is possible to design a configuration to open or close windows or doors in accordance with the instruction information from the instruction device 10.

As described above, the air conditioning system of the present embodiment includes the first air conditioning device 21 and the second air conditioning device 22 as shown in FIG. 1.

The setting information determining the operation states of the first air conditioning device 21 and the second air conditioning device 22 are outputted from the instruction device 10, and the setting information outputted from the instruction device 10 is displayed on a display 23.

The air conditioning system of the present embodiment is configured to allow a person-in-room to control the operation states of the first air conditioning device 21 and the second air conditioning device 22 in accordance with the setting information displayed on the display 23.

The indoor temperature of the indoor space of interest is measured by the indoor temperature meter (first meter) 24, and the outdoor temperature of the outdoor space is measured by the outdoor temperature meter (second meter) 25.

The indoor temperature meter 24 is disposed to measure a temperature of air inside the indoor space, and the outdoor temperature meter 25 is disposed to measure a temperature of air inside the outdoor space.

Note that, each of the indoor temperature meter 24 and the outdoor temperature meter 25 is accommodated in a casing so as not to be affected by heat radiation, in principle. In this regard, it is assumed that the indoor temperature meter 24 is provided to an indoor unit of the second air conditioning device 22, and the outdoor temperature meter 25 is provided to an outdoor unit of the second air conditioning device 22.

Each of the indoor temperature meter 24 and the outdoor temperature meter 25 includes a temperature sensor such as a thermistor, and an output processor (not shown) for outputting data indicative of a digital value corresponding to a temperature measured by the temperature sensor.

The output processor includes a sensor amplifier for amplifying an output of the temperature sensor, and a converter for converting the output of the sensor amplifier into data of a digital signal. The output processor outputs data indicative of a temperature with a step of 0.5° C. or 1° C. When a change in the temperature measured by the temperature sensor is equal to or more than the step, or in response to a request from the instruction device 10, the output processor provides the data to the instruction device 10.

The instruction device 10 includes the indoor obtainer (first obtainer) 11 configured to obtain data of the indoor temperature from the indoor temperature meter 24, the outdoor obtainer (second obtainer) 12 configured to obtain data of the outdoor temperature from the outdoor temperature meter 25, and a storage 13 configured to store data of the indoor temperature and the outdoor temperature.

The indoor temperature obtainer 11 has a function of requesting data on the indoor temperature from the indoor temperature meter 24. The outdoor temperature obtainer 12 has a function of requesting data on the outdoor temperature from the outdoor temperature meter 25.

Additionally, when the data on the outdoor temperature is not sent to the outdoor temperature obtainer 12 from the outdoor temperature meter 25 within a predetermined period after the data of the indoor temperature is sent to the indoor temperature obtainer 11 from the indoor temperature meter 24, the outdoor temperature obtainer 12 requests the data on the outdoor temperature from the outdoor temperature meter 25.

In a similar fashion, when the data on the indoor temperature is not sent to the indoor temperature obtainer 11 from the indoor temperature meter 24 within a predetermined period after the data of the outdoor temperature is sent to the outdoor temperature obtainer 12 from the outdoor temperature meter 25, the indoor temperature obtainer 11 requests the data on the indoor temperature from the indoor temperature meter 24.

According to the above manners, the data on the indoor temperature and the data on the outdoor temperature which relate to substantially the same time are obtained and then stored in the storage 13. In short, the data on the indoor temperature (first data) and the data on the outdoor temperature (second data) are associated with each other on the basis of time.

The instruction device 10 incorporates therein a clock (not shown) for determining date and time. Each of the data on the indoor temperature and the data on the outdoor temperature to be stored in the storage 13 is associated with the date and time of obtaining the data, and then stored in the storage 13.

Further, the instruction device 10 includes an operation determiner 14 configured to create the setting information determining the operation states of the first air conditioning device 21 and the second air conditioning device 22, and an outputter 15 configured to output the setting information created by the operation determiner 14.

Note that, the date and time determined by the clock is required to be accurate. It is desirable that the date and time be corrected anytime based on information obtained through a telecommunication circuit such as the Internet, or a radio wave indicative of standard time in a similar manner to a radio-controlled clock.

The operation determiner 14 creates the setting information for the first air conditioning device 21 and the second air conditioning device 22 by use of the evaluation information indicative of comfortable or uncomfortable feelings of one or more persons-in-room with regard to the air environment of the indoor space, in addition to the data on the indoor temperature and the data on the outdoor temperature.

For this purpose, the air conditioning system of the present embodiment includes the evaluation device 30 configured to determine the evaluation information, and the instruction device 10 includes the evaluation information obtainer 16 configured to obtain the evaluation information from the evaluation device 30.

The evaluation information is defined as information concerning comfort of the air environment of the indoor space for one or more persons (persons-in-room) in the indoor space (hereinafter, also simply referred to as "comfort"). In other words, the evaluation information indicates a level of the comfort of the air environment of the indoor space for one or more persons (persons-in-room) in the indoor space. The evaluation information is information representing feelings of one or more persons-in-room with regard to the air environment of the indoor space. In one case, the evaluation information may indicate any one of two values corresponding to comfort and discomfort, and in another case the evaluation information may indicate any one of multiple levels corresponding to a degree of comfort or discomfort. In the case where the evaluation information indicates any one of multiple levels corresponding to a degree of comfort or discomfort, a high degree of comfort means that the setting information can be widely changed, and a low degree of discomfort means that comfort can be achieved by slightly changing the setting information. A concrete example of the evaluation device 30 is described later.

When the evaluation information obtained by an evaluation information obtainer 16 corresponds to discomfort, the operation determiner 14 creates the setting information determining the operation states of the first air conditioning device 21 and the second air conditioning device 22 as follows, in order to obtain the evaluation information corresponding to comfort in future.

In other words, when determining that the evaluation information corresponding to comfort can be obtained in future as a result of using the first air conditioning device 21, the operation determiner 14 creates the setting information instructing to use only the first air conditioning device 21.

A prerequisite for the operation determiner 14 to create the setting information instructing to use only the first air conditioning device 21 may include a condition that a difference between the data on the outdoor temperature obtained by the outdoor temperature obtainer 12 and the data on the indoor temperature obtained by the indoor temperature obtainer 11 is equal to or more than a prescribed value.

In short, when there is a difference between the outdoor temperature and the indoor temperature and the difference allows improvement of the air environment of the indoor space, ventilation between the indoor space and the outdoor space is conducted by use of the first air conditioning device 21. Note that, to decrease the indoor temperature, it is necessary that the outdoor temperature is lower than the indoor temperature. To increase the indoor temperature, it is necessary that the outdoor temperature is higher than the indoor temperature.

For example, when influence of the outdoor temperature on the indoor space of the building is suppressed by thermal insulator or the like provided to walls or roofs of the building, an increase in the indoor temperature may delay from an increase in the outdoor temperature, or a decrease in the indoor temperature may delay from a decrease in the outdoor temperature. Therefore, even if the outdoor temperature falls within a temperature range comfortable for one or more persons-in-room, the indoor temperature may not be comfortable for one or more persons-in-room in some cases. In such cases, by conducting ventilation by use of the first air conditioning device 21, it is possible to make the indoor temperature close to the outdoor temperature.

In the following, the indoor temperature is represented by $\theta 1$ and the outdoor temperature is represented by $\theta 2$. To simplify explanations, the temperature range comfortable for one or more persons-in-room is assumed to have a lower limit $\theta i$ and an upper limit $\theta s$. When a relation of $\theta 1 > \theta s \geq \theta 2$ or $\theta 2 \geq \theta i > \theta 1$ is satisfied, only the first air conditioning device 21 is used. It is known that a threshold value for the thermal comfort of human is equal to or less than 1° C. Hence, when a difference between the indoor temperature and the outdoor temperature is equal to or more than 1° C., it is considered that effects of improving temperature by ventilation can be obtained.

In other words, the operation determiner 14 is configured to, when the evaluation information obtained by the evaluation information obtainer 16 corresponds to discomfort and a difference between the first data obtained by the first obtainer (indoor temperature obtainer) 11 and the second data obtained by the second obtainer (outdoor temperature obtainer) 12 is equal to or more than a prescribed value, determine whether the comfort can be improved by the first air conditioning device 21. The prescribed value is, for example, 1° C.

The operation determiner 14 is configured to, when a temperature comfortable for one or more persons in the indoor space is between the indoor temperature indicated by the first data obtained by the first obtainer 11 and the outdoor temperature indicated by the second data obtained by the second obtainer 12, determine that the comfort can be improved by the first air conditioning device 21.

The operation determiner 14 is configured to select, as the temperature comfortable for one or more persons in the indoor space, a temperature, which is closest to the indoor temperature, (the indoor temperature indicated by the first data) from a range of temperatures comfortable for one or more persons in the indoor space.

For example, when a relation of $\theta 1 > \theta s$ is satisfied, $\theta s$ is selected as the temperature comfortable for one or more persons in the indoor space. In contrast, when a relation of $\theta i > \theta 2$ is satisfied, $\theta i$ is selected as the temperature comfortable for one or more persons in the indoor space.

The operation determiner 14 is configured to, when determining that the comfort can be improved by the first air conditioning device 21, create the setting information instructing to use the first air conditioning device 21 but not use the second air conditioning device 22.

For example, when determining that the comfort can be improved by the first air conditioning device 21, the operation determiner 14 create the setting information instructing to conduct movement of air from the outdoor space to the indoor space by using the first air conditioning device 21 without using the second air conditioning device 22.

The setting information instructing to use the first air conditioning device 21 may include information indicative of degrees of opening windows or doors, in addition to information instructing to fully open windows or doors. This is because, in a case where a difference between the indoor temperature and the outdoor temperature is relatively large and the outdoor is not comfortable, the indoor temperature may go out from the comfortable temperature range and reach an uncomfortable temperature after a lapse of long time from time of using the first air conditioning device 21 under a condition where windows or doors are fully opened.

In contrast, when determining that it is impossible to obtain the evaluation information corresponding to comfort in future by use of the first air conditioning device 21, the operation determiner 14 creates the setting information instructing to use the second air conditioning device 22.

In case where the first air conditioning device 21 is one or more windows or doors of entrances, the setting information instructing to use the second air conditioning device 22 includes the operation state in which one or more windows or doors serving as the first air conditioning device 21 are closed. However, when the first air conditioning device 21 is configured to use internal heat, or thermal storage, the setting information may be created to instruct to use the second air conditioning device 22 in combination with the first air conditioning device 21.

As described above, the operation determiner 14 is configured to, when determining that the comfort cannot be improved by the first air conditioning device 21, create the setting information instructing to use at least the second air conditioning device 22.

For example, the operation determiner 14 is configured to, when determining that the comfort cannot be improved by the first air conditioning device 21, create the setting information instructing to operate the second air conditioning device 22 so as to adjust the indoor temperature to the temperature comfortable for one or more persons in the indoor space.

Especially, the operation determiner 14 is configured to, when determining that the comfort cannot be improved by the first air conditioning device 21 and when the movement of air from the outdoor space to the indoor space by using the first air conditioning device 21 is already conducted, create the setting information instructing to end the movement of air from the outdoor space to the indoor space by using the first air conditioning device 21 and operate the second air conditioning device 22 so as to adjust the indoor temperature to the temperature comfortable for one or more persons in the indoor space.

The setting information created by the operation determiner 14 is outputted through the outputter 15. The outputter 15 may have at least one of a function of converting the setting information allowing the display 23 to display contents of the setting information, and a function of converting the setting information into at least information for controlling operation of the second air conditioning device 22.

In short, the outputter 15 may be configured to convert the setting information into information in a format available for the predetermined display 23 and output the information. Additionally or alternatively, the outputter 15 may be configured to create, based on the setting information, information for controlling operation of the second conditioner 22.

When the display 23 displays the setting information, a person-in-room checks the setting information displayed on the display 23, and operates the first air conditioning device 21 and the second air conditioning device 22 in line with the setting information.

For example, it is assumed that the first air conditioning device 21 is a window, and the second air conditioning device is an air conditioner. When determining that the comfort can be improved by the first air conditioning device 21, the operation determiner 14 creates a message that "please open the window", as the setting information.

Further, for example, the temperature comfortable for one or more persons in the indoor space is assumed to be θ° C. When determining that the comfort cannot be improved by the first air conditioning device 21, the operation determiner 14 creates a message that "please set the temperature of the air conditioner to θ° C.". In this case, when the window serving as the first air conditioning device 21 is already opened, the operation determiner 14 creates a message that "please close the window and set the temperature of the air conditioner to θ° C.".

It is preferable that the display 23 be an operating and displaying device equipped with a touch panel. However, the touch panel is optional. Further, the display 23 may be separate from the instruction device 10, or may be housed in a casing together with the instruction device 10.

The display 23 may not be a dedicated device. For example, in order to use a general-purpose device such as a smartphone, a tablet terminal, and a personal computer, as the display 23, the outputter 15 may preferably include a communication interface for communicating with such a general-purpose device.

When such a general-purpose device is used as the display 23, an application program for making a general-purpose device function as the display 23 is used, or the outputter 15 is configured to have a function of a server in order to allow a general-purpose device to display the setting information by use of a general-purpose browser.

The aforementioned instruction device 10 includes, as main hardware components, a device including one or more processors operating in accordance with one or more programs and a device acting as an interface. In other words, one or more processors execute one or more programs for realizing the aforementioned functions, and thereby function as the instruction device 10. The device including one or more processors may be a microcomputer incorporating one or more memories, or one or more microprocessors to be used with separate one or more memories. Note that, such one or more programs may be provided through a telecommunication circuit such as the Internet, or by use of a computer-readable recording medium.

As described above, the evaluation device 30 determines the evaluation information indicative of comfortable or uncomfortable feelings of one or more persons-in-room with regard to the air environment of the indoor space. The evaluation device 30 may be configured to allow one or more persons-in-room to input the evaluation information or be configured to calculate the evaluation based on estimation.

The evaluation device 30 configured to allow one or more persons-in-room to input the evaluation information includes an inputter 31 to be operated by one or more persons-in-room. In other words, the evaluation device 30 includes the inputter 31 configured to receive the evaluation information from one or more persons in the indoor space. The evaluation device 30 including the inputter 31 provides information inputted by the inputter 31 to the operation determiner 14 as the evaluation information. When the display 23 is an operating and displaying device, the display 23 may serve as the inputter 31.

When the evaluation information is represented by any one of two values corresponding to comfort and discomfort, the inputter 31 may be configured to include two operation parts for individually selecting comfort and discomfort. The inputter 31 may have another configuration, and for example may be configured to allow selection of any one of three levels of "comfort", "hot", and "cold", instead of two levels of comfort and discomfort. When the discomfort is classified into "hot" and "cold", the indoor temperature may be decreased in response to a case of "hot" and the indoor temperature may be increased in response to a case of "cold". Therefore, there is no need to determine whether the indoor temperature should be decreased or increased.

When the evaluation information is represented by any one of multiple numerical values corresponding to the degree of comfort or discomfort, marks representing the degree of comfort, and a cursor indicating a position of a corresponding one of the marks are displayed on the display 23, and the inputter 31 includes two operation parts (not shown) for moving the cursor upwardly and downwardly. In this configuration, the degree of comfort or discomfort is not inputted as a numerical value. The cursor displayed by the display 23 is moved by operation of one of the operation parts, and the degree of comfort or discomfort is represented by a location at which the cursor is present. This configuration allows intuitive input of the degree of comfort or discomfort in conformity with feelings of one or more persons-in-room.

The PMV which is used as a comfort index is mainly represented by use of numerical values corresponding to seven levels from −3 to +3. The PMV of 0 means a comfortable state, and a change of 0.5 corresponds to a temperature difference of about 1° C. In view of this, preferably, marks may be displayed on the display 23 so that each one level of the PMV is represented by two to four regular marks, and a cursor may be movable at intervals of the regular marks.

When persons-in-room operate the operation parts to indicate the degree corresponding to their thermal comfort by the location of the cursor, the inputter 31 of this configuration can easily calculate the temperature difference corresponding to the comfortable state from the positions of marks. In other words, the operation determiner 14 can determine the desired indoor temperature by use of only the evaluation information outputted from the evaluation device 30.

Note that, the evaluation device 30 configured to calculate the evaluation information based on estimation accumulates previously obtained information and estimates the evaluation information by use of accumulated information.

This evaluation device 30 includes a history storage 34 configured to accumulate past information necessary for estimating the evaluation information, and an estimator 35 configured to estimate, by use of the information accumulated in the history storage 34, the evaluation information concerning a case where one or more persons-in-room exist in the indoor space.

The history storage 34 accumulates a record including a combination of the data on the indoor temperature obtained by the indoor temperature obtainer 11, the data on the outdoor temperature obtained by the outdoor temperature obtainer 12, the setting information outputted from the instruction device 10, and the evaluation information determined by the evaluation device 30. The history storage 34 accumulates the aforementioned record each time the setting information is changed. Therefore, when the setting information is changed, conditions causing generation of the changed setting information which are the indoor temperature, the outdoor temperature, and the evaluation information are stored in the history storage 34.

In brief, the history storage 34 is configured to store a record including a combination of the first data, the second data, the setting information, and the evaluation information. In this regard, it is preferable that the first data, the second data, the setting information, and the evaluation information be associated with each other based on time. The combination of the first data, the second data, the setting information, and the evaluation information which are related to the same time is stored as a record.

The record stored in the history storage 34 preferably include the date and time determined by the clock. In the aforementioned operation example, the history storage 34 stores the record only when the setting information is changed (the setting information is obtained). However, the history storage 34 may further store the record obtained regularly. Alternatively, the history storage 34 may store only the record obtained regularly. A time interval for storing the record in the history storage 34 may be selected from 10 minutes, 30 minutes, 1 hour, and the like.

The evaluation information stored in the history storage 34 is the evaluation information inputted into the inputter 31. Hence, in a case of using the estimator 35, it is necessary to store the evaluation information from the evaluation device 30 by use of the inputter 31 in the history storage 34.

The estimator 35 is configured to estimate current evaluation information from a combination of current first data, current second data, and current setting information, by use of the record stored in the history storage 34.

When the records including the evaluation information are stored in the history storage 34 and the number of records is equal to or more than a predetermined number, the estimator 35 estimates the evaluation information from the records accumulated in the history storage 34 without obtaining the evaluation information from one or more persons-in-room.

The estimator 35 checks the records stored in the history storage 34 for presence of a combination of the data on the indoor temperature obtained by the indoor temperature obtainer 11, the data on the outdoor temperature obtained by the outdoor temperature obtainer 12, and the setting information outputted from the instruction device 10.

The estimator 35 evaluates a degree of similarity in a numerical value between a given combination of the indoor temperature, the outdoor temperature, and the setting information and a corresponding combination of each record stored in the history storage 34, and extracts the record with the degree of similarity which is in a predetermined range. To evaluate the degree of similarity in a numerical value, the sum of squares of differences of the indoor temperatures and the outdoor temperatures is calculated. A point for the setting information is preliminarily determined in accordance with whether pieces of the setting information are matched. The point is added to the sum of squares of differences of the indoor temperatures and the outdoor temperatures. The point for the setting information is set to be smaller in a case where the pieces of the setting information are matched than in a case where the pieces of the setting information are not matched.

In this example, a smaller numerical value representing the degree of similarity indicates a larger degree of similarity. Note that, the numerical value of the degree of similarity of 0 indicates complete matching. Besides, the point for the setting information may not be determined based on whether the pieces of the setting information are matched. Alternatively, when the setting information includes numerical values such as the opening degree of the first air conditioning device 21 and the desired temperature of the second air conditioning device 22, the point for the setting information may be determined based on the sum of squares of differences of the numerical values.

The estimator 35 extracts from the history storage 34 a record satisfying a condition that the aforementioned degree of similarity is in the predetermined range. Therefore the number of extracted records may not be one. When multiple records are extracted, the estimator 35 uses, as new evaluation information, an average of the evaluation information after removal of outliers from the extracted records.

The feelings of comfort or discomfort concerning the air environment may vary among individuals, and the evaluation information may vary based on a value concerning which one of energy saving and comfort is in priority to the other. In view of this, it is preferable that the evaluation device 30 have a function of identifying individuals. To identify individuals, it is preferable to use a technique of face authentication which is stable in function of distinguishing individuals. Therefore, an authenticator 33 performs the face authentication by use of images of faces taken by a TV camera serving as a camera 32.

In the case of identifying individuals as described above, the evaluation information is associated with an individual, and each record stored in the history storage 34 contains information for identifying individuals. Further, when estimating the evaluation information, the estimator 35 searches the history storage 34 based on the identified individual.

The aforementioned three types of evaluation devices 30 may be used in combination or alone. Note that, to use the evaluation device 30 including the estimator 35, it is necessary that the records are accumulated by use of the evaluation device 30 including the inputter 31. In this case, the history storage 34 may be installed in a place different from a building in which the air conditioning system is installed, and may accumulate records collected from a large number of air conditioning systems.

For example, the history storage 34 may collect information from a large number of buildings through a telecommunication circuit such as the Internet, and accumulate records based on the collected information. When a large number of air conditioning systems share the history storage 34 as described above, the records are required to include a condition (characteristic) concerning an individual determining comfort or discomfort, in addition to a condition (such as a condition concerning an environment and a condition concerning a building) determining the air environment of the indoor space.

In a case where a large number of records are accumulated, the estimator 35 can estimate that the similar evaluation information can be obtained when an individual with a similar characteristic is present in the indoor space with a similar condition, by use of the condition concerning the individual and the condition determining the air environment. Note that, to use this configuration, in a similar manner to the aforementioned operation example, it is preferable that the estimator 35 extract multiple records from the history storage 34 and use, as new evaluation information, an average of the evaluation information after removal of outliers from the extracted records.

When the history storage 34 is shared by a large number of air conditioning systems, the estimator 35 is provided to the history storage 34, or is separate from the history storage 34 and provided in each building. In the latter case, the estimators 35 are installed in individual buildings, and extract necessary information from records stored in the history storage 34 through a telecommunication circuit such as the Internet.

After a huge number of records are accumulated in the history storage 34, a relationship between the condition determining the air environment and the condition concerning the individual is extracted, and the extracted relationship is set to the evaluation device 30 of each air conditioning system, and the evaluation information may be extracted by use of such a relationship.

In this configuration, the evaluation information for a person-in-room can be obtained by only identifying the person-in-room in the indoor space. Therefore, in each air conditioning system, the evaluation device 30 is not required to include the inputter 31. Hence, the configuration can be simplified and the production cost can be reduced. Further, also in this configuration, the relationship set to the evaluation device 30 is based on information obtained from real persons-in-room. Therefore, it is possible to control the first air conditioning device 21 and the second air conditioning device 22 so that one or more persons-in-room feel comfortable.

2. Operations

Hereinafter, operations of the air conditioning system of the present embodiment are described. In the following, an initial environment is defined as an air environment of the indoor space at predetermined time such as wake-up time.

The instruction device 10 creates the setting information determining the operation states of the first air conditioning device 21 and the second air conditioning device 22 with reference to the initial environment, so as to achieve the air environment with which one or more persons-in-room in the indoor space feel comfortable.

As for the initial environment, the instruction device 10 does not obtain the evaluation information from the evaluation device 30. Therefore, the instruction device 10 determines initial setting information of the first air conditioning device 21 and the second air conditioning device 22 by use of the index concerning comfort. In other words, the operation determiner 14 calculates the evaluation information for determining the initial setting information of the first air conditioning device 21 and the second air conditioning device 22, by use of the index concerning comfort. Hence, the initial evaluation information is calculated from the index concerning comfort.

In determining the initial setting information of the first air conditioning device 21 and the second air conditioning device 22, the operation determiner 14 determines whether the air environment of the indoor space given by the setting information of interest is comfortable for one or more persons-in-room, and selects the setting information realizing comfort.

Further, the setting information is determined so that amount of energy consumed by the first air conditioning device 21 and the second air conditioning device 22 is minimized, providing that one or more persons-in-room feel comfortable with the air environment.

The operation determiner 14 may determine the setting information of the first air conditioning device 21 and the second air conditioning device 22 so as to minimize not the amount of energy but cost caused by operation of the first air conditioning device 21 and the second air conditioning device 22.

For example, when electric power is consumed for using the first air conditioning device 21 and the second air conditioning device 22, the amount of energy consumed by the first air conditioning device 21 and the second air conditioning device 22 correspond to an amount of electric power necessary for operation, and the cost correspond to an electric rate. Note that, when a unit price of the electric rate is determined for each time period, the cost may not increase with an increase in the amount of electric power.

Whether to use the setting information instructing to use only the first air conditioning device 21 or the setting information instructing to use the second air conditioning device 22 is determined so that at least one of the amounts of energy and the cost is minimized, providing that the index concerning comfort indicates comfort, as described above.

The first priority is given to the setting information instructing not to use both the first air conditioning device 21 and the second air conditioning device 22. The second priority is given to the setting information which is the setting information instructing to use only the first air conditioning device 21 and does not cause consumption of an energy resource such as opening and closing windows or entrances.

When only the first air conditioning device 21 is used, the index concerning comfort may not fall within a comfortable range due to conditions such as the outdoor temperature. In this case, the setting information is determined to instruct to use the second air conditioning device 22.

For example, the index concerning comfort may be PMV (Predicted Mean Vote) calculated from temperature, humidity (relative humidity), airstream, thermal radiation, metabolic initiation, an amount of clothing, and the like.

The instruction device 10 obtains data on temperature from the indoor temperature meter 24, and obtains data on humidity from a humidity meter (not shown). The humidity meter is provided to the indoor equipment of the second air conditioning device 22 together with the indoor temperature meter 24. As for the airstream, the thermal radiation, the metabolic initiation, and the amount of clothing, individual default values are used. The index concerning comfort is not limited to PMV, but may be another value such as a discomfort index calculated from temperature and humidity (relative humidity).

The index concerning comfort described above does not reflect subjective comfort of one or more persons-in-room. Therefore, by using such an index only, it is difficult to optimize the air environment so that the one or more persons-in-room feel comfortable.

Note that, PMV reflects the metabolic initiation and the amount of clothing, and therefore by measuring these values accurately, comfort for individual one or more persons-in-room is reflected to some extent. However, it is difficult to measure the metabolic initiation and the amount of clothing continuously, and hence the default values are used as alternatives to measurements of the metabolic initiation and the amount of clothing.

For this reason, even when the index concerning comfort is used in determining the setting information of the first air conditioning device 21 and the second air conditioning device 22, it is difficult to obtain the setting information reflecting the subjective comfort of one or more persons-in-room in the indoor space.

In view of this, after determining the setting information corresponding to the initial operation states, the operation determiner 14 determines the next setting information of the first air conditioning device 21 and the second air conditioning device 22 by use of the evaluation information outputted from the evaluation device 30.

For example, when one or more persons-in-room in the indoor space feel uncomfortable with the air environment of the indoor space, the setting information of the first air conditioning device 21 and the second air conditioning device 22 is determined to realize the air environment with which one or more persons-in-room in the indoor space feel comfortable.

When determining the setting information, the outputter 15 displays the setting information on the display 23. Therefore, one or more persons-in-room check the setting information and adjust the setting information of the first air conditioning device 21 and the second air conditioning device 22 in accordance with the setting information displayed on the display 23, and thereby the comfortable air environment can be achieved.

Note that, the outputter 15 may be configured to provide the setting information to the first air conditioning device 21 and the second air conditioning device 22 through telecommunications. Alternatively, the outputter 15 may be configured to provide the setting information to only the second air conditioning device 22 through telecommunications.

It takes time from time of changing the setting information of the first air conditioning device 21 and the second air conditioning device 22 to time when the air environment of the indoor space is in a desired state. Therefore, after a lapse of predetermined judgement time from time of determining the setting information, the operation determiner 14 obtains the evaluation information from the evaluation device 30. This predetermined judgement time may be selected from 5 minutes, 10 minutes, 30 minutes, 1 hour, and the like.

The judgement time may be variable. For example, after change of the setting information, the judgement time is set to 5 minutes. When the evaluation information obtained after 5 minutes indicates comfort, the next judgment time is set to 1 hour to obtain the evaluation information. In contrast, when the evaluation information obtained after 5 minutes indicates discomfort, the evaluation information is obtained after a lapse of next 5 minutes.

When the evaluation device 30 includes the inputter 31, one or more persons-in-room input the inputter 31 information indicative of whether the air environment is comfortable. Note that, the inputter 31 is required to receive the input from one or more persons-in-room after a lapse of the aforementioned judgement time. Therefore, it is preferable that the inputter 31 provide an announcement for prompting one or more persons-in-room to give the input after a lapse of the aforementioned judgement time.

Alternatively, when one or more persons-in-room does not operate the inputter 31 after a lapse of the judgement time, the inputter 31 considers the air environment to be comfortable and performs processing's corresponding to comfort. In this case, the inputter 31 may be configured to receive input corresponding to discomfort.

Further, when the evaluation device 30 includes the estimator 35, the evaluation device 30 obtains the indoor temperature, the outdoor temperature, and the setting information associated with the time after a lapse of the judgement time, and estimates the evaluation information.

For the aforementioned operation, whether the air environment is comfortable for one or more persons-in-room in the indoor space is determined in consideration for feelings of one or more persons-in-room. Consequently, the setting information of the first air conditioning device 21 and the second air conditioning device 22 is determined so that the air environment becomes comfortable.

As a result, even if the current air environment of the indoor space is uncomfortable, by appropriately determining the setting information of the first air conditioning device 21 and the second air conditioning device 22, the air environment of the indoor space is improved to be comfortable.

Note that, the priority order of the setting information of the first air conditioning device 21 and the second air conditioning device 22 from the highest to the lowest is the setting information instructing not to use both the first air conditioning device 21 and the second air conditioning device 22, the setting information instructing to use only the first air conditioning device 21, and the setting information instructing to use the second air conditioning device 22.

Therefore, the setting information corresponding to a lower energy consumption is selected preferentially, and this leads to energy saving. Further, an increase in an amount of energy consumed for making the air environment of the indoor space comfortable is suppressed, and therefore an increase in the cost caused by operating the first air conditioning device 21 and the second air conditioning device 22 is suppressed.

Note that, when the setting information outputted from the outputter 15 is used for controlling the first air conditioning device 21 and the second air conditioning device 22, it is preferable that the aforementioned operation be terminated when no person is in the indoor space and there is no need to improve the air environment of the indoor space. In view of this, detection of one or more persons in the indoor space is performed by use of a human sensor or a camera. Only when one or more persons exist, the setting information is outputted from the outputter 15 to the first air conditioning device 21 and the second air conditioning device 22.

Note that, in some cases, one or more persons-in-room may leave the room temporarily. Therefore, it is preferable that, when one or more persons are not detected after they are detected in the indoor space, the setting information of the first air conditioning device 21 and the second air conditioning device 22 be kept the same for predetermined time. This predetermined time may be in a range of 5 to 30 minutes, for example. Additionally, when the outputter 15 outputs the setting information to only the display 23, the function of detecting one or more persons in the indoor space may be omitted.

Figure 2:
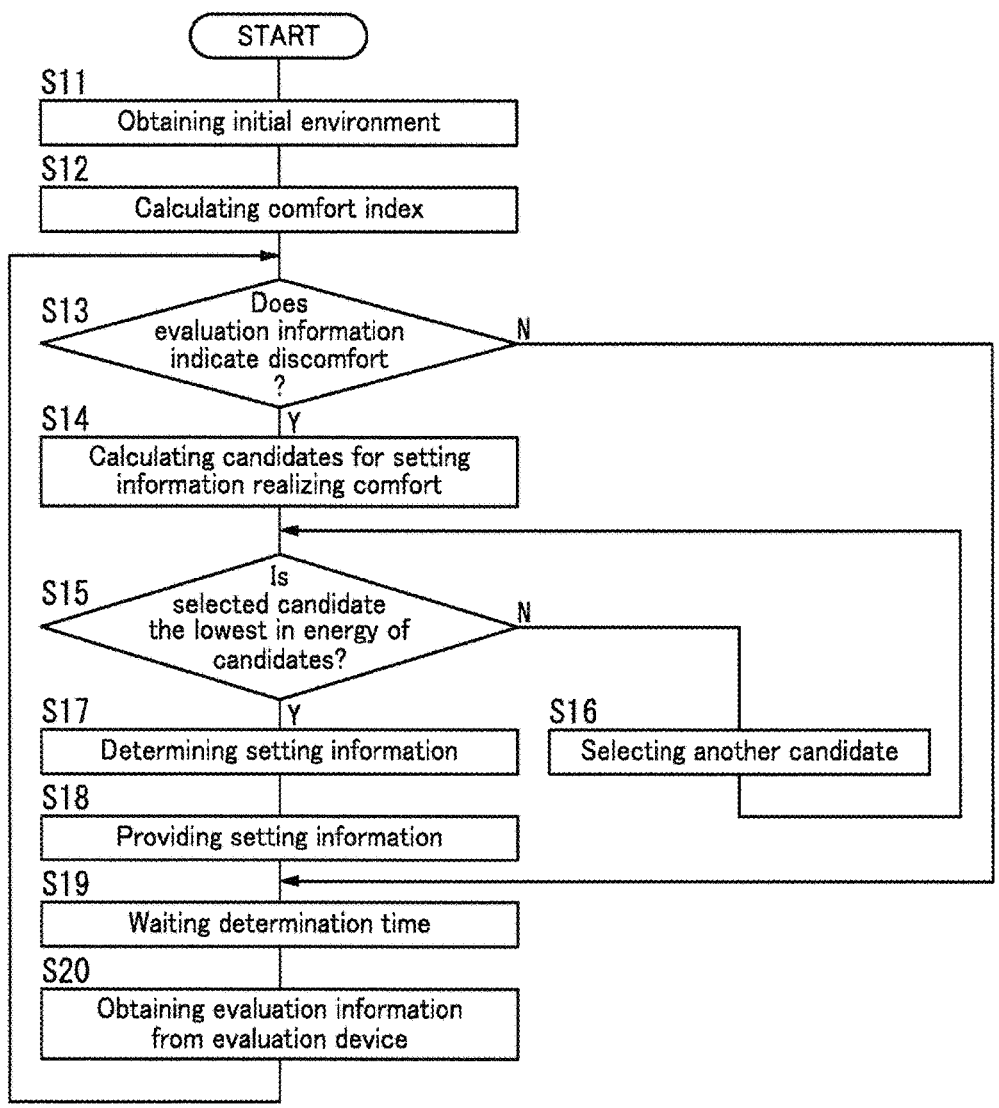
FIG. 2 is a diagram illustrating operation of the air conditioning system of Embodiment 1.

The aforementioned operations are shown in FIG. 2 collectively. It is assumed that the operation example shown in FIG. 2 relates to a case in which the evaluation information is obtained from the inputter 31.

The instruction device 10 obtains the initial environment (S11), and calculates the index concerning comfort (S12). The instruction device 10 calculates the evaluation information from the calculated index concerning comfort. When the calculated evaluation information indicates discomfort (S13: Y), the operation determiner 14 calculates one or more candidates of the setting information achieving comfort (S14). When multiple candidates are obtained, each candidate is evaluated in terms of whether an amount of energy is lowest in the comfortable range (S15). When the amount of energy is not lowest, another candidate is selected (S16). As described above, the operation determiner 14 selects the setting information achieving the lowest amount of energy (S17). The selected setting information is displayed on the display (displaying unit) 23 by way of the outputter 15, or is provided as a control signal to the first air conditioning device 21 or the second air conditioning device 22 by way of the outputter 15 (S18).

After a lapse of the judgement time from time of changing the operation state of the first air conditioning device 21 or the second air conditioning device 22 in accordance with the setting information (S19), the evaluation information obtainer 16 obtains the evaluation information from the evaluation device 30 (S20). The obtained evaluation information is evaluated in terms of whether it indicates discomfort, in step S13. When the evaluation information is determined not to indicate discomfort in step S13 (S13: N), the evaluation information obtainer 16 obtains the evaluation information from the evaluation device 30 (S20) after a lapse of the judgement time (S19). Hereinafter, the aforementioned operations are repeated.

As described above, the instruction device 10 obtains subjective comfortable or uncomfortable feelings of one or more persons-in-room for the air environment of the indoor space from the evaluation device 30, and creates the setting information determining the operation states of the first air conditioning device 21 and the second air conditioning device 22.

Therefore, it is possible to determine the operation states of the first air conditioning device 21 and the second air conditioning device 22 so that one or more persons-in-room feel comfortable, without executing complex calculation by use of computer simulation. Thus, it is possible to realize the air environment with which one or more persons-in-room feel subjectively comfortable. Additionally, the operation determiner 14 selects, from candidates of the setting information determining the operation states to realize comfort, the setting information achieving the lowest amount of consumed energy, and therefore energy saving can be achieved.

3. Features

The aforementioned air conditioning system of the present embodiment includes the first air conditioning device 21, the second air conditioning device 22, the evaluation device 30, and the instruction device 10. The first air conditioning device 21 is configured to cause movement of air between the indoor space whose air environment is to be controlled and the outdoor space whose air environment is not to be controlled. The second air conditioning device 22 is configured to control the air environment of the indoor space to the different air environment from the outdoor space by consuming an energy resource. The evaluation device 30 is configured to determine the evaluation information indicative of comfortable or uncomfortable feelings of one or more persons-in-room for the air environment of the indoor space. The instruction device 10 is configured to output the setting information determining the operation states of the first air conditioning device 21 and the second air conditioning device 22. The instruction device 10 includes the first obtainer 11, the second obtainer 12, the operation determiner 14, and the outputter 15. The first obtainer 11 is configured to obtain data concerning the air environment of the indoor space from the first meter 24 as the first data. The second obtainer 12 is configured to obtain data concerning the air environment of the outdoor space from the second meter 25 as the second data. The evaluation information obtainer 16 is configured to obtain the evaluation information from the evaluation device 30. The operation determiner 14 is configured to create the setting information. The outputter 15 is configured to output the setting information created by the operation determiner 14. The operation determiner 14 is configured to, in a case where the evaluation information obtained by the evaluation information obtainer 16 corresponds to discomfort and a difference between the first data obtained by the first obtainer 11 and the second data obtained by the second obtainer 12 is equal to or more than a prescribed value, create the setting information instructing to use only the first air conditioning device 21 when determining that the evaluation information can be improved to be comfortable by use of the first air conditioning device 21, and create the setting information instructing to use the second air conditioning device 22 when determining that the evaluation information cannot be improved to be comfortable by use of the first air conditioning device 21.

In the air conditioning system, the air environment is temperature. The second air conditioning device 22 is configured to cause heat radiation or heat absorption by consuming an energy resource. The first obtainer 11 is the indoor temperature obtainer configured to obtain the data on the indoor temperature from the indoor temperature meter. The second obtainer 12 is the outdoor temperature obtainer configured to obtain the data on the outdoor temperature from the outdoor temperature meter.

In the air conditioning system, the evaluation device 30 includes the inputter 31 configured to allow one or more persons-in-room in the indoor space to input the evaluation information.

In the air conditioning system, the evaluation device 30 includes the history storage 34 and the estimator 35. The history storage 34 is configured to store a record including a combination of the first data obtained by the first obtainer 11, the second data obtained by the second obtainer 12, the setting information outputted from the instruction device 10, and the evaluation information determined by the evaluation device 30, each time the setting information is changed. The estimator 35 is configured to estimate the evaluation information from a combination of the first data obtained by the first obtainer 11, the second data obtained by the second obtainer 12, and the setting information outputted from the instruction device 10, by use of one or more records stored in the history storage 34.

In the air conditioning system, the outputter 15 is configured control the first air conditioning device 21 and the second air conditioning device 22 by use of the setting information.

In the air conditioning system, the outputter 15 is configured to cause the display 23 to display the setting information.

As described above, the air conditioning system of the present embodiment includes the first air conditioning device 21 (passive air conditioning device) for causing movement of air between the indoor space and the outdoor space and the second air conditioning device 22 (active air conditioning device) for controlling the air environment of the indoor space to be different from the air environment of the outdoor space. The air conditioning system of the present embodiment further includes the evaluation device 30 configured to determine the evaluation information indicative of comfortable or uncomfortable feelings of one or more persons-in-room for the air environment of the indoor space. The instruction device 10 creates the setting information for the first air conditioning device 21 and the second air conditioning device 22, by use of the first data concerning the air environment of the indoor space, the second data concerning the air environment of the outdoor space, and the evaluation information. Consequently, in the air conditioning system including the passive air conditioning device and the active air conditioning device, it is possible to achieve, by use of information determined by the evaluation device 30, the air environment with which one or more persons-in-room feel comfortable.

The instruction device 10 in the present embodiment constitutes the aforementioned air conditioning system in combination with the first air conditioning device 21, the second air conditioning device 22, and the evaluation device 30. The first air conditioning device 21 is configured to cause movement of air between the indoor space whose air environment is to be controlled and the outdoor space whose air environment is not to be controlled. The second air conditioning device 22 is configured to control the air environment of the indoor space to the different air environment from the outdoor space by consuming an energy resource. The evaluation device 30 is configured to determine the evaluation information indicative of comfortable or uncomfortable feelings of one or more persons-in-room for the air environment of the indoor space. The instruction device 10 is configured to output the setting information determining the operation states of the first air conditioning device 21 and the second air conditioning device 22. The instruction device 10 includes the first obtainer 11, the second obtainer 12, the operation determiner 14, and the outputter 15. The first obtainer 11 is configured to obtain data concerning the air environment of the indoor space from the first meter 24 as the first data. The second obtainer 12 is configured to obtain data concerning the air environment of the outdoor space from the second meter 25 as the second data. The evaluation information obtainer 16 is configured to obtain the evaluation information from the evaluation device 30. The operation determiner 14 is configured to create the setting information. The outputter 15 is configured to output the setting information created by the operation determiner 14. The operation determiner 14 is configured to, in a case where the evaluation information obtained by the evaluation information obtainer 16 corresponds to discomfort and a difference between the first data obtained by the first obtainer 11 and the second data obtained by the second obtainer 12 is equal to or more than a prescribed value, create the setting information instructing to use only the first air conditioning device 21 when determining that the evaluation information can be improved to be comfortable by use of the first air conditioning device 21, and create the setting information instructing to use the second air conditioning device 22 when determining that the evaluation information cannot be improved to be comfortable by use of the first air conditioning device 21.

As described above, the instruction device 10 of the present embodiment includes the following first feature.

In the first feature, the instruction device 10 includes a first obtainer 11, a second obtainer 12, an evaluation information obtainer 16, an operation determiner 14, and an outputter 15. The first obtainer 11 is configured to obtain first data indicative of a numerical value corresponding to an air environment of an indoor space. The second obtainer 12 is configured to obtain second data indicative of a numerical value corresponding to an air environment of an outdoor space. The evaluation information obtainer 16 is configured to obtain evaluation information concerning comfort of the air environment of the indoor space for one or more persons in the indoor space. The operation determiner 14 is configured to create setting information determining operation states of a first air conditioning device 21 configured to cause movement of air between the indoor space and the outdoor space and a second air conditioning device 22 configured to control the air environment of the indoor space by consuming an energy resource. The outputter 15 is configured to output the setting information created by the operation determiner 14. The operation determiner 14 is configured to, when the evaluation information obtained by the evaluation information obtainer 16 corresponds to discomfort and a difference between the first data obtained by the first obtainer 11 and the second data obtained by the second obtainer 12 is equal to or more than a prescribed value, determine whether the comfort can be improved by the first air conditioning device 21. The operation determiner 14 is configured to, when determining that the comfort can be improved by the first air conditioning device 21, create the setting information instructing to use the first air conditioning device 21 but not use the second air conditioning device 22. The operation determiner 14 is configured to, when determining that the comfort cannot be improved by the first air conditioning device 21, create the setting information instructing to use at least the second air conditioning device 22.

Further, the instruction device 10 includes the following second to ninth features. Note that, the second to ninth features are optional.

In the second feature realized in combination with the first feature, the air environment of the indoor space is an indoor temperature defined as a temperature of air in the indoor space. The air environment of the outdoor space is an outdoor temperature defined as a temperature of air in the outdoor space. The second air conditioning device 22 is configured to cause heat radiation or heat absorption by consuming the energy resource. The first obtainer 11 is configured to obtain the first data from an indoor temperature meter for measuring the indoor temperature. The second obtainer 12 is configured to obtain the second data from an outdoor temperature meter for measuring the outdoor temperature.

In the third feature realized in combination with the second feature, the operation determiner 14 is configured to, when a temperature comfortable for one or more persons in the indoor space is between the indoor temperature indicated by the first data obtained by the first obtainer 11 and the outdoor temperature indicated by the second data obtained by the second obtainer 12, determine that the comfort can be improved by the first air conditioning device 21.

In the fourth feature realized in combination with the third feature, the operation determiner 14 is configured to, when determining that the comfort can be improved by the first air conditioning device 21, create the setting information instructing to conduct movement of air from the outdoor space to the indoor space by using the first air conditioning device 21 without using the second air conditioning device 22.

In the fifth feature realized in combination with the third or fourth feature, the operation determiner 14 is configured to, when determining that the comfort cannot be improved by the first air conditioning device 21, create the setting information instructing to operate the second air conditioning device 22 so as to adjust the indoor temperature to the temperature comfortable for one or more persons in the indoor space.

In the sixth feature realized in combination with the third or fourth feature, the operation determiner 14 is configured to, when determining that the comfort cannot be improved by the first air conditioning device 21 and when the movement of air from the outdoor space to the indoor space by using the first air conditioning device 21 is already conducted, create the setting information instructing to end the movement of air from the outdoor space to the indoor space by using the first air conditioning device 21 and operate the second air conditioning device 22 so as to adjust the indoor temperature to the temperature comfortable for one or more persons in the indoor space.

In the seventh feature realized in combination with any one of the third to sixth features, the operation determiner 14 is configured to select, as the temperature comfortable for one or more persons in the indoor space, a temperature, which is closest to the indoor temperature, from a range of temperatures comfortable for one or more persons in the indoor space.

In the eighth feature realized in combination with any one of the first to seventh features, the outputter 15 is configured to create, based on the setting information, information for controlling operation of the second air conditioning device 22.

In the ninth feature realized in combination with any one of the first to eighth features, the outputter 15 is configured to convert the setting information into information in a format available for a predetermined display 23 and output the information.

The air conditioning system of the present embodiment includes the following tenth feature. In the tenth feature, the air conditioning system includes a first air conditioning device 21, a second air conditioning device 22, an evaluation device 30, and an instruction device 10. The first air conditioning device 21 is configured to cause movement of air between an indoor space and an outdoor space. The second air conditioning device 22 is configured to control an air environment of the indoor space by consuming an energy resource. The evaluation device 30 is configured to create evaluation information concerning comfort of the air environment of the indoor space for one or more persons in the indoor space. The instruction device 10 includes the first feature. Note that, the instruction device 10 further includes the second to ninth features. However, the second to ninth features are optional.

Additionally, the air conditioning system of the present embodiment includes the following eleventh and twelfth features. Note that, the eleventh and twelfth features are optional.

In the eleventh feature realized in combination with the tenth feature, the evaluation device 30 includes an inputter 31 configured to receive the evaluation information from one or more persons in the indoor space.

In the twelfth feature realized in combination with the tenth or eleventh feature, the evaluation device 30 includes a history storage 34 and an estimator 35. The history storage 34 is configured to store a record including a combination of the first data, the second data, the setting information, and the evaluation information. The estimator 35 is configured to estimate current evaluation information from a combination of current first data, current second data, and current setting information, by use of the record stored in the history storage 34.

(Embodiment 2)

In the air conditioning system of Embodiment 1, to improve the air environment of the indoor space, the instruction device 10 determines the setting information of the first air conditioning device 21 and the second air conditioning device 22 based on the indoor temperature and the outdoor temperature.

In the air conditioning system of the present embodiment, an explanation is made to a case where additional information available for determining the setting information of the first air conditioning device 21 and the second air conditioning device 22, that is, additional information concerning effects on the air environment of the indoor space is obtained in addition to the indoor temperature and the outdoor temperature. Hereinafter, such a type of additional information is referred to as auxiliary information. In other words, the auxiliary information is information concerning a factor effecting on the air environment of the indoor space.

When the auxiliary information is obtained, the operation determiner 14 of the instruction device 10 creates the setting information based on the auxiliary information in combination with the indoor temperature and the outdoor temperature.

The auxiliary information may be selected from the environmental information including the indoor temperature and the outdoor temperature, the setting information determining the operation states of the first air conditioning device 21 and the second air conditioning device 22, building information including a thermal property and a site of the indoor space, and person-in-room information concerning one or more persons-in-room in the indoor space.

The environmental information may be selected from temperatures (the indoor temperature and the outdoor temperature), humidities, and wind speeds of the indoor space and the outdoor space. Further, components of air (air qualities) of the indoor space and the outdoor space can be considered. The environmental information can be obtained by measurement by sensors suitable for objects to be measured. Further, one or more pieces of the environmental information may be obtained by processing information provided through a telecommunication circuit such as the Internet.

The setting information may be the setting information created by the instruction device 10 or information set by one or more persons-in-room of the indoor space in determining the operation state of the first air conditioning device 21 or the second air conditioning device 22. The setting information set by one or more persons-in-room may be selected from a desired temperature, a desired humidity, a desired wind direction, and a desired wind speed. Further, this setting information may include day and time (time period) in which the first air conditioning device 21 and the second air conditioning device 22 are operated. The setting information set by one or more persons-in-room indicates desired values, and therefore can be used as information giving an indication of the air environment with which one or more persons-in-room feel comfortable.

The thermal property of the indoor space in the building information may include a thermal transmittance of a member for isolating a room (e.g., walls, roofs, floors, and windows), a floor area, and a room layout. The thermal transmittance may be calculated from used material, a structure, and an area. The thermal property of the indoor space is based on the above information and is used for estimating an effect of heat of the outdoor space on the indoor space. Note that, to calculate the thermal property of the indoor space more accurately, measurement is necessary.

The site in the building information is determined in order to obtain an indication of information concerning a meteorological phenomenon such as temperature, a climate, a wind direction, and a wind speed. Therefore, the building information may include information concerning insolation or a wind direction such as a direction of building and positions of windows and openings. In view of this, basically, it is necessary to manually input the building information. Note that, the site (a location and a landform) in the building information may be obtained from a combination of information of a location obtained from a positioning system using artificial satellites such as GPS (Global Positioning System) and information on an electronic map available through a telecommunication circuit such as the Internet.

The persons-in-room information is information concerning presence or absence and the number of persons-in-room in the indoor space, and is used for reducing effects on the indoor temperature caused by presence of one or more persons-in-room. Further, in using the second air conditioning device 22, when the number of persons-in-room is known, it is possible to adjust thermal load in conformity with the number. Therefore, a wasted increase in a consumption of energy can be suppressed.

The person-in-room information is provided by one or more persons-in-room to the instruction device 10, or is extracted from information obtained by one or more human sensors or cameras. When one or more persons-in-room provides the person-in-room information to the instruction device 10, the inputter 31 may be configured to have a function for allowing input of the person-in-room information.

Part of the environmental information, the building information, and the person-in-room information may be calculated by use of relevant elements. For example, with regard to the thermal property in the building information, it is possible to estimate movement of heat between the indoor space and the outdoor space by use of tendencies of changes of the indoor temperature and the outdoor temperature. Further, when the thermal property of the indoor space under a condition where windows and entrances are closed is known, it is possible to estimate the indoor temperature under a condition where windows and entrances are closed, by use of an element causing an increase in the temperature in the indoor space and the outdoor temperature. Information considered as the element causing an increase in temperature in the indoor space may include the number of persons-in-room, usage states of electric appliances, and usage states of heating cookers.

Figure 3:
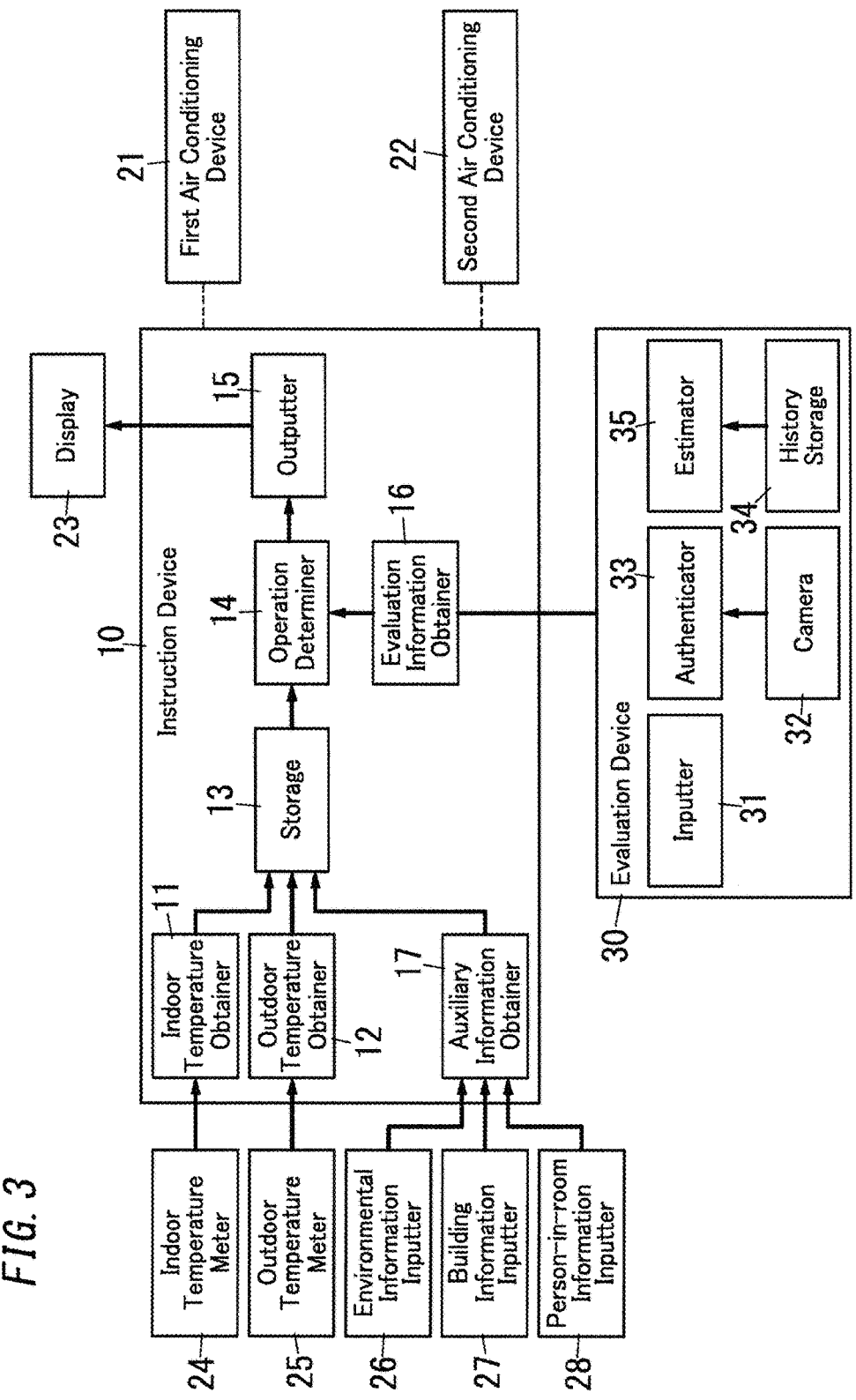
FIG. 3 is a block diagram illustrating the air conditioning system of Embodiment 2.

FIG. 3 shows an example of configuration in which the environmental information, the building information, and the person-in-room information are used. The instruction device 10 includes an auxiliary information obtainer 17 configured to obtain the environmental information, the building information, and the person-in-room information from an environmental information inputter 26, a building information inputter 27, and a person-in-room information inputter 28 respectively.

In a case where the aforementioned auxiliary information is obtained, the operation determiner 14 of the instruction device 10 determines the operation states of the first air conditioning device 21 and the second air conditioning device 22 by use of data on the auxiliary information in addition to data on the indoor temperature and the outdoor temperature.

In this regard, to determine the operation states of the first air conditioning device 21 and the second air conditioning device 22 by use of the auxiliary information in addition to the indoor temperature and the outdoor temperature, it is considered to perform simulation regarding thermal energy. In more detail, it is considered to estimate, by simulation, thermal energy per unit time of air moved between the indoor space and the outdoor space by the first air conditioning device 21 and thermal energy per unit time of heat moving through a partition isolating the indoor space.

In using the first air conditioning device 21, when the thermal energy of heat moving between the indoor space and the outdoor space can be estimated, it is possible to obtain an indication of whether the air environment can be changed to be comfortable for one or more persons-in-room by use of the first air conditioning device 21. When the second air conditioning device 22 is not used, the operation determiner 14 can determine whether the air environment can be changed to be comfortable for one or more persons-in-room by use of the first air conditioning device 21, by conducting the aforementioned simulation.

The result of the simulation can be used as information for making determination of whether the air environment of the indoor space can be changed to be comfortable. However, it is not ensured whether an effect is obtained to an extent that one or more persons-in-room actually feel comfortable. Therefore, after the first air conditioning device 21 is used in accordance with the setting information concerning the first air conditioning device 21 obtained by use of the auxiliary information, the operation determiner 14 receives from the evaluation device 30 the evaluation information at time after a lapse of the judgement time. When receiving the evaluation information from the evaluation device 30, the operation determiner 14 determines whether to use the second air conditioning device 22 in accordance with contents of the evaluation information.

Note that, the evaluation device 30 described in Embodiment 1 may have any one of a configuration for allowing one or more persons-in-room in the indoor space to input the evaluation information, a configuration for obtaining the evaluation information from one or more persons-in-room in a contactless manner, and a configuration for calculating the evaluation information by estimation. In contrast, one or more persons-in-room may preliminarily set a condition concerning the desired air environment with which the one or more persons-in-room feel comfortable, and compares the set condition with the environmental information obtained by measurements by sensors or the like. Thus, a result of the comparison may be used as the evaluation information.

When the air environment of the indoor space is not comfortable for one or more persons-in-room, a desired condition for one or more persons-in-room may be set to the evaluation device 30 by use of the inputter 31 and the display 23. The set condition is a condition concerning temperature, humidity and/or the like, and the evaluation device 30 determines a range for the condition inputted by one or more persons-in-room. For example, when the set condition indicates temperature, a range of ±1° C. or ±0.5° C. centered on the temperature indicated by the set condition is determined.

When one or more persons-in-room inputs the condition, the operation determiner 14 creates the setting information in conformity with the inputted condition. The created setting information may cause an increase in the amount of energy consumed for operating the first air conditioning device 21 or the second air conditioning device 22, or increase in the cost caused by such operation.

In contrast, the objective of the air conditioning system of the present embodiment is to suppress increases in the amount of energy and the cost as possible. Hence, when an increase in the amount of energy or an increase in the cost exceeds a predetermined criterion, the operation determiner 14 discards the created setting information. Further, the operation determiner 14 may be configured to ask, by use of the display 23, one or more persons-in-room about whether use of the setting information is acceptable.

The instruction device 10 stores a history of the condition inputted by one or more persons-in-room. After a lapse of the judgement time, the evaluation device 30 compares the condition stored as the history with the air environment realized based on the setting information, and provides a result of the comparison to the operation determiner 14 as the evaluation information. In brief, the next control information after a lapse of the judgement time from the time one or more persons-in-room input a desired condition is created so as to reflect the desired condition for one or more persons-in-room.

As described above, one or more persons-in-room are allowed to input the desirable condition. When reflection of preference of one or more persons-in-room may cause an increase in the amount of energy or an increase in the cost, one or more persons-in-room are asked about whether to ignore the condition. Therefore, it is possible to achieve both comfort and energy saving.

In this regard, one or more persons-in-room may be asked about which one of comfort and energy saving is in priority to the other. A range of a condition set by one or more persons-in-room to the evaluation device 30 may be changed in accordance with the priority order set by one or more persons-in-room. Alternatively, the evaluation device 30 may preliminarily limit a range of a condition to be inputted in consideration of energy saving, and when a condition which does not fall within the limited condition range is inputted, the evaluation device 30 may give warning to one or more persons-in-room. When one or more persons-in-room accept an increase in the amount of energy or an increase in the cost for achieving comfort, the evaluation device 30 may exceptionally allow input of a condition which does not fall within the limited condition range. Other configurations and operations of the air conditioning system of the present embodiment are same as those of the air conditioning system of Embodiment 1.

As described above, in the air conditioning system of the present embodiment, the operation determiner 14 creates new setting information based on auxiliary information concerning effects on the air environment of the indoor space in combination with the first data obtained by the first obtainer 11 and the second data obtained by the second obtainer 12.

In other words, the instruction device 10 includes the following thirteenth feature in addition to the first feature. The instruction device 10 may further include the second to ninth features.

In the thirteenth feature realized in combination with any one of the first to ninth features, the operation determiner 14 is configured to create the setting information on the basis of the first data obtained by the first obtainer 11, the second data obtained by the second obtainer 12, and auxiliary information. The auxiliary information is information concerning a factor effecting on the air environment of the indoor space.

The invention claimed is:

1. An instruction device, comprising:
a first obtainer configured to obtain first data indicative of a numerical value corresponding to an air environment of an indoor space;
a second obtainer configured to obtain second data indicative of a numerical value corresponding to an air environment of an outdoor space;
an evaluation information obtainer configured to obtain evaluation information concerning comfort of the air environment of the indoor space for one or more persons in the indoor space;
an operation determiner configured to create setting information determining operation states of a first air conditioning device configured to cause movement of air between the indoor space and the outdoor space and a second air conditioning device configured to control the air environment of the indoor space by consuming an energy resource; and
an outputter configured to output the setting information created by the operation determiner, the operation determiner being configured to:
when the evaluation information obtained by the evaluation information obtainer corresponds to discomfort and a difference between the first data obtained by the first obtainer and the second data obtained by the second obtainer is equal to or more than a prescribed value, determine whether the comfort can be improved by the first air conditioning device;
when determining that the comfort can be improved by the first air conditioning device, create the setting information instructing to use the first air conditioning device but not use the second air conditioning device; and
when determining that the comfort cannot be improved by the first air conditioning device, create the setting information instructing to use at least the second air conditioning device.

2. The instruction device according to claim 1, wherein:
the air environment of the indoor space is an indoor temperature defined as a temperature of air in the indoor space;
the air environment of the outdoor space is an outdoor temperature defined as a temperature of air in the outdoor space;
the second air conditioning device is configured to cause heat radiation or heat absorption by consuming the energy resource;
the first obtainer is configured to obtain the first data from an indoor temperature meter for measuring the indoor temperature; and
the second obtainer is configured to obtain the second data from an outdoor temperature meter for measuring the outdoor temperature.

3. The instruction device according to claim 2, wherein the operation determiner is configured to, when a temperature comfortable for one or more persons in the indoor space is between the indoor temperature indicated by the first data obtained by the first obtainer and the outdoor temperature indicated by the second data obtained by the second obtainer, determine that the comfort can be improved by the first air conditioning device.

4. The instruction device according to claim 3, wherein the operation determiner is configured to, when determining that the comfort can be improved by the first air conditioning device, create the setting information instructing to conduct movement of air from the outdoor space to the indoor space by using the first air conditioning device without using the second air conditioning device.

5. The instruction device according to claim 3, wherein the operation determiner is configured to, when determining that the comfort cannot be improved by the first air conditioning device, create the setting information instructing to operate the second air conditioning device so as to adjust the indoor temperature to the temperature comfortable for one or more persons in the indoor space.

6. The instruction device according to claim 3, wherein the operation determiner is configured to, when determining that the comfort cannot be improved by the first air conditioning device and when the movement of air from the outdoor space to the indoor space by using the first air conditioning device is already conducted, create the setting information instructing to end the movement of air from the outdoor space to the indoor space by using the first air conditioning device and operate the second air conditioning device so as to adjust the indoor temperature to the temperature comfortable for one or more persons in the indoor space.

7. The instruction device according to claim 3, wherein:

the operation determiner is configured to select, as the temperature comfortable for one or more persons in the indoor space, a temperature, which is closest to the indoor temperature, from a range of temperatures comfortable for one or more persons in the indoor space.

8. The instruction device according to claim 1, wherein:

the operation determiner is configured to create the setting information on a basis of the first data obtained by the first obtainer, the second data obtained by the second obtainer, and auxiliary information; and the auxiliary information is information concerning a factor effecting on the air environment of the indoor space.

9. The instruction device according to claim 1, wherein the outputter is configured to create, based on the setting information, information for controlling operation of the second air conditioning device.

10. The instruction device according to claim 1, wherein:

the outputter is configured to convert the setting information into information in a format available for a predetermined display and output the information.

11. An air conditioning system, comprising:

a first air conditioning device configured to cause movement of air between an indoor space and an outdoor space;

a second air conditioning device configured to control an air environment of the indoor space by consuming an energy resource;

an evaluation device configured to create evaluation information concerning comfort of the air environment of the indoor space for one or more persons in the indoor space; and the instruction device according to claim 1.

12. The air conditioning system according to claim 11, wherein the evaluation device includes an inputter configured to receive the evaluation information from one or more persons in the indoor space.

13. The air conditioning system according to claim 11, wherein the evaluation device includes:

a history storage configured to store a record including a combination of the first data, the second data, the setting information, and the evaluation information; and an estimator configured to estimate current evaluation information from a combination of current first data, current second data, and current setting information, by use of the record stored in the history storage.

* * * * *